United States Patent [19]

Kapaan

[11] 4,040,684
[45] Aug. 9, 1977

[54] ROLLING BEARING

[75] Inventor: Hendrikus Jan Kapaan, Ijsselstein, Netherlands

[73] Assignee: SKF Industries, Inc., King of Prussia, Pa.

[21] Appl. No.: 667,517

[22] Filed: Mar. 16, 1976

[30] Foreign Application Priority Data

Mar. 18, 1975 Netherlands .................. 7503173

[51] Int. Cl.² .......................................... F16C 33/78
[52] U.S. Cl. .............................................. 308/187.1
[58] Field of Search ............... 308/36.1, 187, 187.1, 308/190, 187.2; 277/54, 57

[56] References Cited

U.S. PATENT DOCUMENTS

| 3,268,279 | 8/1966 | Greby | 308/187 X |
| 3,602,559 | 8/1971 | Hirschler | 308/187.1 |
| 3,717,394 | 2/1973 | Pitner | 308/187.1 |
| 3,936,105 | 2/1976 | Asberg | 308/187.1 |
| 3,944,305 | 3/1976 | Asberg | 308/187.1 |

Primary Examiner—Robert R. Song
Assistant Examiner—Gene A. Church
Attorney, Agent, or Firm—Daniel M. Rosen

[57] ABSTRACT

A rolling bearing comprising two rotating parts formed by an inner and outer race fitted with mounting flanges, a plurality of rows of rolling elements, separated by cages, positioned between the races, and a plane seal for sealing the races to prevent the ingress of foreign substances while retaining any lubricant that is present in the space between the races and the seal, the plane seal being formed by a space in a substantially axial direction between the surfaces of the two rotating parts and having a seal placed therein.

23 Claims, 4 Drawing Figures

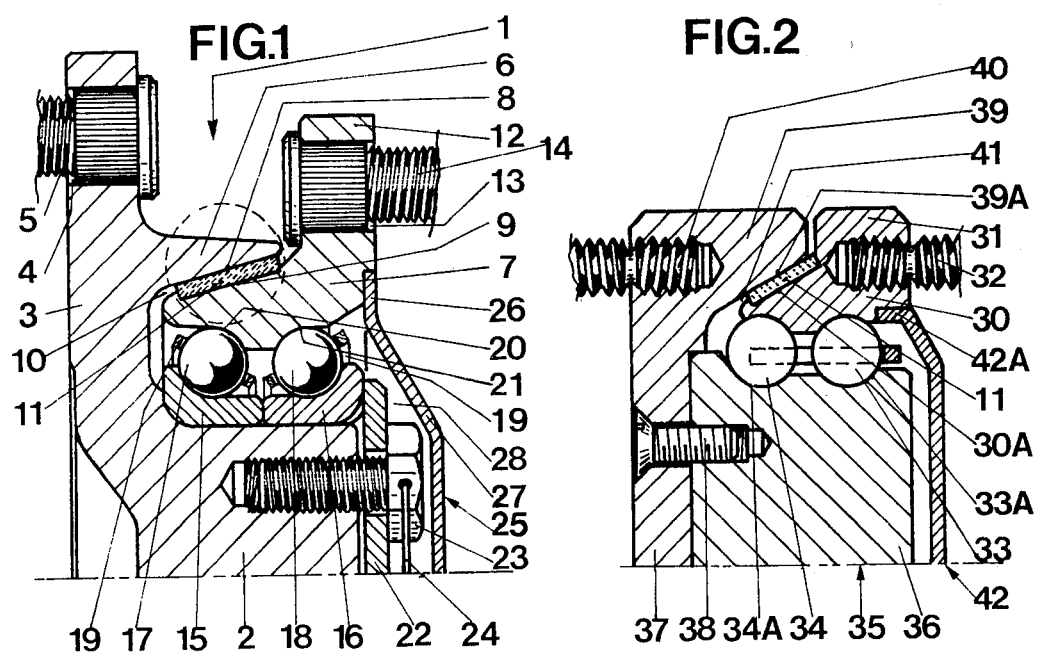
FIG.1
FIG.2
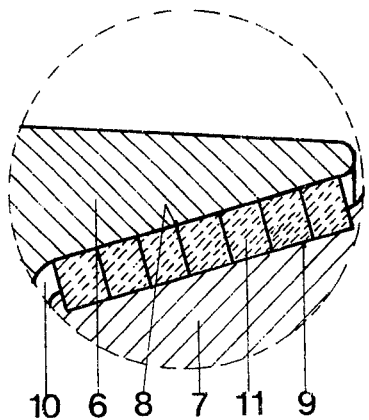
FIG.3
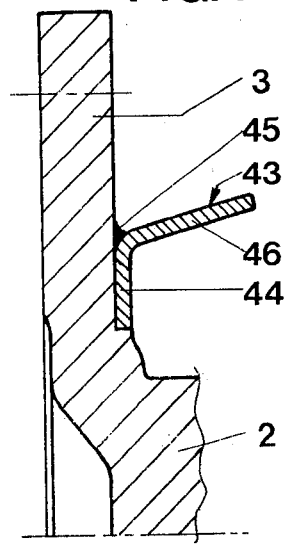
FIG.4

ROLLING BEARING

THE INVENTION

The invention relates to rolling bearing, and particularly to a rolling bearing construction comprising an inner and outer race fitted with mounting flanges and having several rows of rolling elements separated by cages between the races. Sealing elements for preventing ingress of dirt, mud or other foreign matter are included and, in addition, are capable of retaining any lubricant in the space between the races and the seals.

Bearings for special applications, such as agricultural machines or earth-moving equipment, have stringent sealing requirements. The sealing must remain effective, even under extremely arduous conditions. Such conditions can often occur, such as when the vehicle or machine to which this type of bearing is fitted is operating on muddy or sandy terrain or at great depths. The sealing elements are then frequently subject to high pressures or stresses and thus tend, after a while, to admit dirt, mud, or sand particles into the interior of the bearing, thereby greatly reducing the bearing service life.

The object of the invention is to provide a novel and unique bearing of the above-mentioned type, in which the disadvantages described above are avoided.

In accordance with the foregoing object, the present invention provides a gap or narrow annular space, between two rotating components of the bearing, following a mainly axial direction, into which the seal is placed. The effect is a plane sealing between the rotating components. Unlike the conventional lip-type seals that are used in the prior art, an effective seal is obtained because the gap or the narrow annular space can be filled completely with a suitable sealing element.

In the preferred embodiment, the gap or annular space is fitted with several adjacent sealing rings of substantially identical shape, preferably made with packing cord. This produces an efficient and relatively inexpensive seal.

In the preferred embodiment, the invention is characterized by the fact that the gap or the narrow annular space is bounded by one side of the outer race and by one part of the inner race at a short distance from the former. The result is a comparatively stiff bearing in which the dimensions of the sealing space can be accurately determined. The bearing may be further characterized by the fact that the flange part extending over the outer race is formed by an annular element fastened to the flange of the inner race; the fastening being accomplished by such techniques as welding and/or pressing on to the flange.

According to another favorable practical execution of the rolling bearing, in accordance with a further aspect of the invention, a sealing element is formed by a plate fastened at its edge in the flanges part of the outer race; this plate also protects adjusting devices for the races, the rolling elements and the sealing element in the bearing.

In another favorable practical execution of the rolling bearing, in accordance with a further aspect of the invention, the rolling elements are fitted in tracks which are formed directly into the races. The inner race comprises a solid center with a plate or flange affixed thereto, the raised edge of which extends over the outer race, thus forming the gap or the narrow annular space. It is preferrable that this mounting plate or flange be made of a different material than that of the inner race, such as cast iron.

The invention will be explained below in more detail with reference to the appended figures, wherein:

FIG. 1 shows part of a cross-section through a bearing in accordance with the invention;

FIG. 2 also shows a further cross-section through a part of a bearing in accordance with the invention;

FIG. 3 shows an enlarged detail of a practical execution of the seal of the bearing according to FIGS. 1 and 2; and FIG. 4 shows part of a cross-section through a sealing ring affixed to a flange of the bearing.

As is shown in FIG. 1, the rolling bearing 1 comprises a closed or solid inner ring or bearing housing 2 which merges into a flange 3 fitted with holes 4 for accommodating fixing bolts 5. The flange 3 is fitted with a tapered ring 6, variable to a greater or lesser degree, and extending over the outer race 7. The inner surface 8 of the ring 6, together with the outer surface 9 of the race 7, forms the boundary surfaces of a gap or narrow annular space 10. A sealing element 11 is placed into this space. The sealing element is a material known as packing cord. In this embodiment a few rings of packing cord 11 (see also FIG. 3) are adjacently placed in the surface 9 of the outer race 7. Instead of separate rings 11 the sealing element may alternatively comprise one single cord, helically wound in the surface 9 of the race 7, or it may comprise one comparatively wide ring.

The outer race is also fitted with a flange 12 with holes 13 to accommodate fixing bolts 14. Furthermore, the annular recess is milled out of the race 7 in the conventional manner and finished to be able to retain the packing cord in the correct manner.

In this embodiment, the inner race is formed by two races 15 and 16 into which ball-shaped rolling elements 17 and 18 have been placed, respectively. A cage 19 separates each rotating or rolling element and retains these in one place. The rolling elements are fixed at a given contact angle between the race elements 15 and 16 and the tracks 20 and 21, respectively of the outer race 7. Significantly, the race elements 15 and 16 abut under a given load so that the rolling elements 17 and 18 rotate in their tracks with the correct amount of play. For this purpose, an adjuster plate or ring 22 is placed against the solid bearing housing 2 and the adjuster bolts 23 apply the correct load between the races 15, 16, the rolling elements 17, 18 and between the surface 8 and the sealing 11. The adjuster bolts 23 are locked against slackening by conventional means 24.

Another favorable seal is formed by a sealing plate 25, fitted or pressed into position at its outer edge 26. The raised part 27 of the plate 25 protects and retains both the adjusting mechanism 22, 23, 24 and the space 28 containing the bearing lubricant. The plate 25 may be made from any suitable material, such as a light material or plastic.

In the above-described manner, an improved type of bearing is described with an efficient plane sealing of a gap or a narrow annular space 10 between the flanged parts of the inner and outer races. In addition, good protection is provided to the interior of the bearing by means of the sealing plate 25 so that even under extreme conditions, such as a muddy soil or working deep below ground level, the bearing gives optimum performance.

Referring to FIG. 2, an alternative embodiment is shown. The embodiment of FIG. 2, although fitted with the same sealing devices as the bearing in FIG. 1, has a comparatively small flange 31 fitted to the outer race 30, and accommodating the fixing bolts 32 close to the travel area of rolling elements 33 and 34. The inner race 35 comprises a solid center part 36 into which the tracks 33A and 34A, for the rolling elements 33 and 34 respectively, have been made. In addition, the center part may also be fitted with a centering opening and key-slots.

The sealing plate 25 is made to comform to the shape of the center. The inner race 35 further comprises a flanged part 37 which is secured by fixing bolts 38 into the center part 36. The flange 39, which contains the fixing bolts 40, has a tapered portion that extends over the outer race 30, which portion forms the gap or annular sealing space 41, into which the seal is placed. The flanged part 37, 39 should preferably be made of a cast material thus greatly reducing the production costs of this type of bearing. A favored practical execution of this version includes parts 30 and 36 made of sintered powder materials, while the flange 37, 39 may be made of a cheaper cast material. The effectiveness of the seal 11 in space 41 is not reduced by using different materials.

This effectiveness of the seal is thus markedly increased because the seal formed between surfaces 8, 9, (FIG.1) or 30A, 39A (FIG. 2) of races 6, 7 and 30, 39, respectively, is now held axially. In the practical executions shown here, the axial holding or fixing is effected by the adjusting mechanism 22, 23 (FIG. 1) or the fixing elements 38 (FIG. 2). It is very important here that the efficiency of the seal in space 10 or 41 respectively, is both adjustable and afterwards re-adjustable.

FIG. 3 shows the enlarged detail of the packing cord seal 11 as used in the bearings according to FIGS. 1 and 2, the same reference symbols being used in these two figures to designate like components. An annular groove 9 has been machined into the inner race 7 into which separate rings 11 have been fitted. This forms a pack of sealing rings which is in contact with the top of surface 8 of ring 6 of flange 3 over a comparatively great width. This surface seal, which is thus comparatively wide, makes ingress, of foreign substance, such as mud, practically impossible, even under high pressure.

It will be understood that the invention is not restricted to the application of packing cord as a seal; other types of annular or otherwise regular shaped seals, composed of various materials and which are fitted round the outer race 7 without protruding therefrom, are included within the conception of the invention.

Referring to FIG. 4, there is shown an embodiment of the flanged part 3 to which a ring 43 is fixed, the angled part 44 of which is secured to the flange by a weld 45 or by pressing. Part 46 of ring 43, when fitted, forms in fact the surface that extends over the outer race 7, thus forming the gap or the annular sealing space. In this way it will be apparent to one skilled in the art to execute the concept of the present invention as specified on existing bearing constructions. Other variations, modifications, additions, substitutions, or deletions, will be apparent to those skilled in the art, within the spirit and scope of the present invention.

What is claimed is:

1. A rolling bearing comprising two rotating parts formed by an inner and outer race fitted with mounting flanges, a plurality of rows of rolling elements, separated by cages, positioned between said races, and plane sealing means for sealing said races to prevent the ingress of foreign substances while retaining any lubricant that is present in the space between said races and the seal, said plane sealing means including a space formed in a substantially axial direction by opposing surfaces of said two rotating parts and having said seal placed therein in contact with said opposing surfaces and across said space.

2. A rolling bearing in accordance with claim 1, wherein said space is bounded by a first side of said outer race and a portion of a mounting flange of said inner race, said portion extending over said side at a short distance therefrom, whereby a comparatively wide seal is obtained.

3. A rolling bearing in accordance with claim 1, wherein the one of said mounting flanges extending over said outer race is formed by an annular element fastened to the mounting flange of said inner race.

4. A rolling bearing in accordance with claim 3, wherein a raised edge of said annular element is welded to said flange.

5. A rolling bearing in accordance with claim 1, wherein said seal is of a symmetrical cross-section, placed completely over said outer race and lying within its circumference.

6. A rolling bearing in accordance with claim 5, wherein said seal comprises one single comparatively wide ring.

7. A rolling bearing in accordance with claim 1, wherein said seal is formed by several adjacent sealing rings.

8. A rolling bearing in accordance with claim 1, wherein said seal is helically wound round said outer race.

9. A rolling bearing in accordance with claim 1, wherein said seal comprises a packing cord.

10. A rolling bearing in accordance with claim 1, wherein said seal consists of various layers of different sealing material.

11. A rolling bearing in accordance with claim 1, wherein said seal is formed by a plate, the edge of which is fitted into a mounting flange of said outer race.

12. A rolling bearing in accordance with claim 11, wherein said plate is a protecting element for an adjusting mechanism for said races and said rolling elements.

13. A rolling bearing in accordance with claim 1, wherein each row of said plurality of rows of rolling elements is placed on a separate race, said races abutting under a given load, means for adjusting said races and said seal, said means including an adjuster ring or plate and locking bolts, adjustable in relation to each other and in relation to the sealing surface respectively.

14. A rolling bearing in accordance with claim 1, wherein said inner race contains a solid center part.

15. A rolling bearing in accordance with claim 1, wherein said rolling elements are placed in tracks that form into said races, said inner race including a solid center part being fitted with a plate or flange secured thereto, a raised edge of said plate or flange extending over said outer race, thereby forming said sealing space.

16. A rolling bearing in accordance with claim 15, wherein said mounting plate or flange is made from a different material than said outer race part.

17. A rolling bearing in accordance with claim 1, wherein said contact pressure between said seal and said sealing surface is adjustable and re-adjustable in a mainly axial direction.

18. A rolling bearing comprising relatively rotatable inner and outer race assemblies separated by a plurality of rows of rolling elements, said inner and outer race assemblies including a first sealing means sealing one side of said bearing from ingress of foreign substances to said rolling elements, a second sealing means sealing the other side of said bearing from ingress of foreign substances, said second sealing means including first and second planar seal boundaries formed by axially aligned separated surfaces of said inner and outer race assemblies, and a seal fixed between said separated surfaces.

19. A rolling bearing in accordance with claim 18, wherein said seal is of a symmetrical cross-section, placed completely over said outer race and lying within its circumference.

20. A rolling bearing in accordance with claim 18, wherein said seal comprises one single comparatively wide ring.

21. A rolling bearing in accordance with claim 18, wherein said seal is formed by several adjacent sealing rings.

22. A rolling bearing in accordance with claim 18, wherein said seal is helically wound round said outer race.

23. A rolling bearing in accordance with claim 18, wherein said seal comprises packing cord.

* * * * *